United States Patent
Illner et al.

(10) Patent No.: US 7,282,289 B2
(45) Date of Patent: Oct. 16, 2007

(54) PLANAR AND ESSENTIALLY RECTANGULAR FUEL CELL AND FUEL CELL BLOCK

(75) Inventors: Dieter Illner, Erlangen (DE); Josef Lersch, Heroldsbach (DE); Arno Mattejat, Bubenreuth (DE)

(73) Assignee: Siemens Aktiengesellschaft, Munich (DE)

( * ) Notice: Subject to any disclaimer, the term of this patent is extended or adjusted under 35 U.S.C. 154(b) by 537 days.

(21) Appl. No.: 10/469,585

(22) PCT Filed: Feb. 22, 2002

(86) PCT No.: PCT/EP02/01911

§ 371 (c)(1),
(2), (4) Date: Feb. 23, 2004

(87) PCT Pub. No.: WO02/073724

PCT Pub. Date: Sep. 19, 2002

(65) Prior Publication Data

US 2004/0121206 A1    Jun. 24, 2004

(30) Foreign Application Priority Data

Mar. 2, 2001    (EP) .................. 01105148

(51) Int. Cl.
*H01M 8/02* (2006.01)
(52) U.S. Cl. ........................ 429/26
(58) Field of Classification Search .............. 429/26; 165/166–167
See application file for complete search history.

(56) References Cited

U.S. PATENT DOCUMENTS 5,230,966 A    7/1993    Voss et al.

FOREIGN PATENT DOCUMENTS

| EP | 0 591 800 A1 | 4/1994 |
|---|---|---|
| EP | 0 591 800 B1 | 4/1994 |
| JP | 08130028 | 5/1996 |
| JP | 2000260439 | 1/2001 |
| WO | WO0145187 | 6/2001 |
| WO | WO 200167021 A1 * | 9/2001 |

* cited by examiner

*Primary Examiner*—Gregg Cantelmo
(74) *Attorney, Agent, or Firm*—Harness, Dickey & Pierce, P.L.C.

(57) ABSTRACT

A planar, rectangular and water-cooled fuel cell includes a cooling element with a cooling chamber through which cooling water flows during the operation of the fuel cell. Cooling water does not flow through the cooling chamber in a homogeneous manner, normally resulting in local heating of the fuel cell in regions through which the cooling water flows through less frequently. A fuel cell is provided with a cooling element which includes an essentially rectangular cooling chamber with four corner regions, whereby the opening of the coolant flow is arranged in the first corner, the opening of a first coolant flow is arranged in a second corner and a second coolant flow is disposed in a third corner. The first coolant flow has a cross section $Q_1$ on the narrowest point thereof and the second coolant flow has a cross section $Q_2$ on the narrowest point thereof, the ratio of $Q_1/Q_2$ being 7-25.

12 Claims, 2 Drawing Sheets

PLANAR AND ESSENTIALLY RECTANGULAR FUEL CELL AND FUEL CELL BLOCK

This application is the national phase under 35 U.S.C. § 371 of PCT International Application No. PCT/EP02/01911 which has an International filing date of Feb. 22, 2002, which designated the United States of America and which claims priority on European Patent Application number EP 01105148.9 filed Mar. 2, 2001, the entire contents of which are hereby incorporated herein by reference.

FIELD OF THE INVENTION

The invention generally relates to a planar and essentially rectangular fuel cell having a cooling element. Preferably, the cooling element has an essentially rectangular coolant space with four corner regions. The mouth of the coolant inflow is preferably arranged in a first corner region, and the mouth of a first coolant outflow is preferably arranged in a second corner region. In addition, the invention generally relates to a fuel cell block having such a fuel cell.

BACKGROUND OF THE INVENTION

In a fuel cell, electrical energy and heat are generated by the combination of hydrogen (H2) and oxygen (O2) in an electrochemical reaction, the hydrogen and the oxygen being combined to form water (H2O). A single fuel cell supplies an operating voltage of a maximum of 1.1 V. For this reason, a plurality of planar fuel cells are stacked one on top of the other and are combined to form a fuel cell block. By virtue of the fuel cells of the fuel cell block being connected in series it is possible for the operating voltage of the fuel cell block to be several hundred volts. A fuel cell in a fuel cell block includes a diaphragm electrode unit which is also referred to as an electrolyte electrode unit, and the composite printed circuit board which is adjacent thereto on both sides. The composite printed circuit board can be configured as cooling elements.

The technical implementation of the principle of the fuel cell has lead to different solutions, specifically with different types of electrolytes and operating temperatures between 80° C. and 1000° C. Depending on its operating temperature, the fuel cells are classified as low-temperature fuel cells, medium-temperature fuel cells and high-temperature fuel cells which are distinguished in turn by various technical embodiments.

The heat which is produced in a fuel cell by the electrochemical reaction must be carried away from the fuel cell so that the fuel cell is not destroyed by overheating. In the case of a low-temperature fuel cell, this heat is usually carried away using a coolant circuit, the coolant, generally water, flowing through the fuel cell, absorbing heat there and giving off the heat outside the fuel cell. For this purpose, the fuel cell includes a cooling element which can be used either for cooling the fuel cell or else for heating the fuel cell, for example when the fuel cell block is started up. The coolant element has a coolant space through which the coolant, generally the cooling water, flows while the fuel cell is operating. The coolant space has a coolant inflow and a coolant outflow, the coolant inflow and the coolant outflow being arranged in such a way that the stream of coolant which flows from the inflow to the outflow cools the fuel cell as uniformly as possible.

EP 0 591 800 B1 discloses a cooling element which is composed of two plates and has a rectangular coolant space, the inflow and the outflow for the coolant being arranged in corner regions of the coolant space which are diagonally opposite one another. When cooling water flows through such a coolant space, the centre region of the coolant space is effectively cooled, but only a small amount of cooling water flows through the corner regions of the coolant space which are not adjacent to the inflow or outflow. This results in the fuel cell being heated to a greater degree in these corner regions than in its central region which adjoins the central region of the coolant space. In an extreme case, such defective conveying away of heat from the corner regions through which there is a weak flow leads to the electrolyte diaphragm of the fuel cell being destroyed at these points.

SUMMARY OF THE INVENTION

An object of an embodiment of the present invention is therefore to disclose a fuel cell in which heat is conveyed away from the elements of the fuel cell which are adjacent to the coolant space in a homogenized way in comparison with the prior art. In addition, an object of an embodiment of the present invention is to disclose a fuel cell block with a fuel cell with such improved conveying away of heat.

An object is achieved by a fuel cell which, according to an embodiment of the invention, has a second coolant outflow in a third corner region of the coolant space. The first coolant outflow may have a flow cross section Q1 at its narrowest point, and the second coolant outflow may have a flow cross section Q2 at its narrowest point, and the ratio Q1/Q2 being 7 to 25.

By use of a second coolant outflow in a further corner region, an improved flow through this corner region which otherwise has a weak through-flow is achieved. As a result, the time for which the coolant water is present in this corner region is reduced, enabling it to absorb more heat there from the components of the fuel cell which are giving off heat, and the conveying away of heat by the cooling water from the fuel cell is thus homogenized. The cooling element can be configured with only a single second cooling outflow in a corner region or else with two second coolant outflows in two different corner regions. The second coolant outflow (or the second coolant outflows) is configured in such a way that considerably less coolant can flow out of the coolant space of the coolant element through said outflow than from the first coolant outflow. As a result, the main flow of coolant through the coolant space from the coolant inflow to the first coolant outflow is not significantly disrupted.

Only a small part of the coolant is branched off from this main flow and directed through the second coolant outflow. This smaller amount is selected in such a way that it is sufficient to keep the corner region, through which there is otherwise a weak flow, at approximately the same temperature as the central region of the fluid space.

It has been shown in trials that, with an essentially rectangular coolant space, a coolant flow of approximately 3 to 10%, in particular 4 to 7%, through the third corner region, that is to say through the second coolant outflow, is sufficient to cause heat to be conveyed away uniformly in this corner region in comparison with the central region of the coolant space. Depending on the configuration of the coolant outflows, such a flow to the second coolant outflow is achieved if the flow cross section Q1 of the first coolant outflow is approximately 7 to 25 times as large as the flow cross section Q2 of the second coolant outflow at its narrowest point. If the first coolant outflow is configured in the form of, for example, 20 individual small ducts, the second coolant outflow is expediently embodied in the form of, for example, only one such duct. If the first coolant outflow is formed, for example, from only a single duct, its flow cross section Q1 at its narrowest point is expediently 7 to 10 times the flow cross section Q2 of the second coolant outflow which is embodied as a single duct.

In an advantageous configuration of an embodiment of the invention, the first and second corner regions are arranged essentially diagonally opposite one another. The first corner region with the mouth of the coolant inflow, and the second corner region with the mouth of the first and large coolant outflow form the starting point and end point of the main flow of coolant through the coolant space of the cooling element of the fuel cell. If these two corner regions lie essentially diagonally opposite one another, the largest possible quantity of heat is transferred from the fuel cell into the cooling water by this main flow. The regions of the coolant space through which this main flow flows to the smallest degree are located in the two other corner regions of the coolant space which are opposite one another. However, in one of these corner regions, or both of these corner regions, a second coolant outflow is arranged through which the flow of coolant through the coolant space is homogenized to a high degree.

In a fuel cell which is operated geodetically in an essentially vertically arranged fashion in a fuel cell block, that is to say in such a way that the plane of the cells is oriented essentially perpendicular to the surface of the earth, air bubbles collect in the coolant space in the course of the operation, at the upper edge of the coolant space. In the case of a fuel cell which is provided for such operation, the third corner region with the second coolant outflow is expediently arranged at the upper edge of the coolant space. In such an arrangement, the air bubbles can emerge from the coolant space through the second coolant outflow, effectively avoiding overheating of the fuel cell at the upper edge of the coolant space.

An object which the fuel cell block can solve may be achieved by use of a fuel cell block with a fuel cell in which the first coolant outflow opens into a first axial duct of the fuel cell block, and the second coolant outflow opens into a second axial duct of the fuel cell block, and the two axial ducts are connected to one another using a pressure equalizing line.

An axial duct is understood to be a duct which runs in the stacking direction of the fuel cells within the fuel cell block which is composed of a plurality of stacked fuel cells. It is therefore oriented in the axial direction of the fuel cell block. The cooling fluid is taken out of the fuel cell block through such an axial duct of the fuel cell block. The coolant circuit in a fuel cell system which comprises a fuel cell block is generally an open circuit in which the pressure of the fluid within the axial duct which carries away cooling water is dependent on the geodetic height at which the axial duct, or a line adjoining it, opens to atmospheric pressure.

The pressure ratio between the fluid pressure in the first axial duct with respect to the fluid pressure in the second axial duct is thus dependent on where the two axial ducts, or a line which is connected to them, open into the open air. As the flow of cooling fluid through a coolant outflow is dependent on the pressure within the axial duct to which the cooling fluid opens, it is desirable for the fluid pressure within the first axial duct to be in a fixed ratio with respect to the fluid pressure within the second axial duct. This is because it is only this way that it is possible to ensure that the flow of fluid through the first coolant outflow is in a predeterminable ratio with respect to the flow of coolant through the second coolant outflow. This ratio would thus be independent of the conveying of coolant from the fuel cell block into the fuel cell system.

As a result of a pressure equalization line between the two axial ducts, the pressure in the two axial ducts is essentially always the same. As a result, the flow ratio through the two fluid outflows is always strictly defined and independent of the opening of the axial ducts into the open air. Uniform conveying of heat out of the fuel cell into the coolant, and thus a uniform temperature within the fuel cell are thus achieved.

The pressure equalizing line can be embodied in the form of a line, but it can also be equally well formed by a duct in the fuel cell block which connects the two axial ducts to one another. Such a duct may be arranged, for example, within the end plate or connecting plate of the fuel cell block or within an intermediate plate between the fuel cell block and a humidifier which is adjacent to it.

BRIEF DESCRIPTION OF THE DRAWINGS

Exemplary embodiments of the invention are explained in more detail with reference to two figures, in which.

DETAILED DESCRIPTION OF THE PREFERRED EMBODIMENTS

Figure 1:
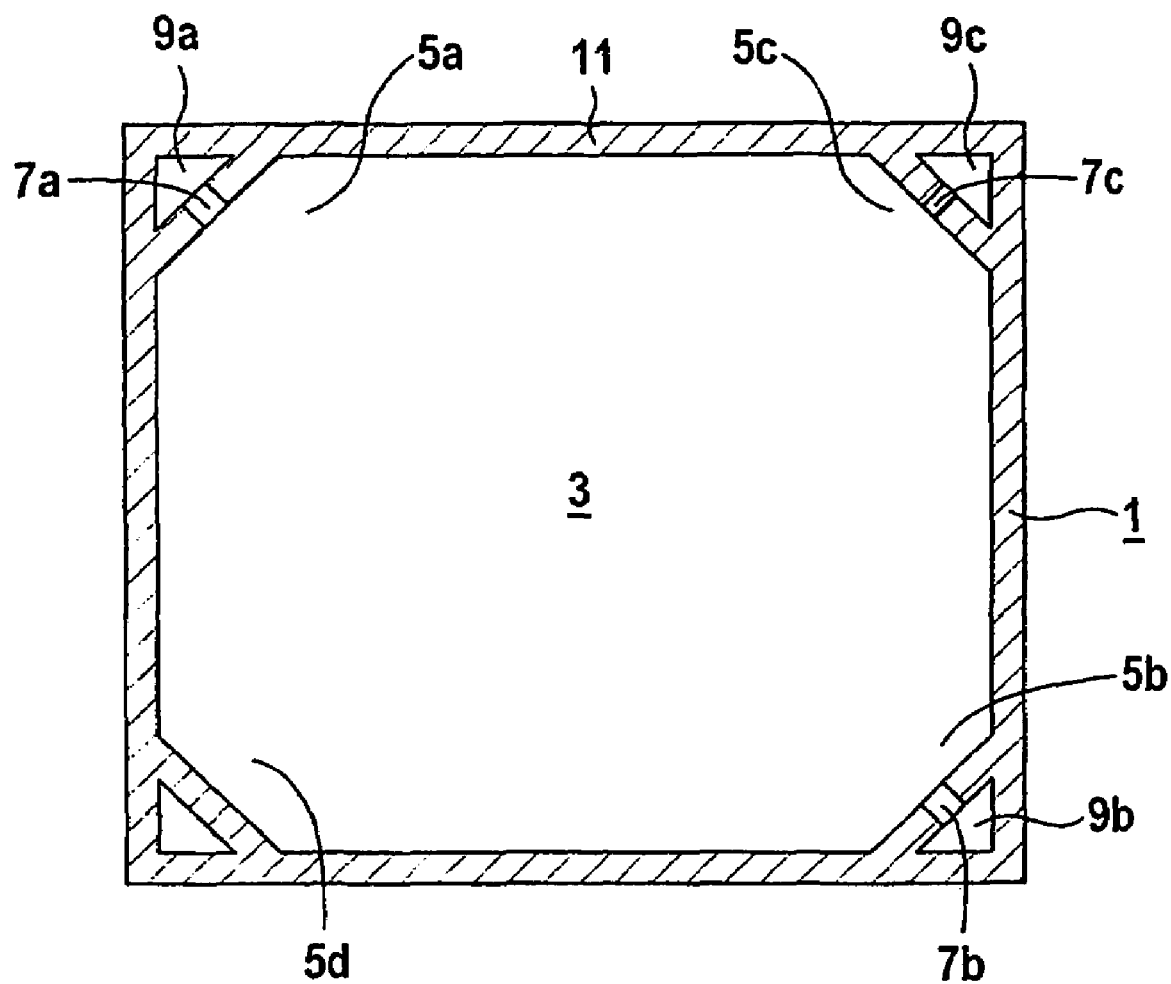
FIG. 1 shows a section through a cooling element of a planar and rectangular fuel cell.

FIG. 1 represents a section through a cooling element 1 of a planar and rectangular fuel cell, the fuel cell including, in addition to the cooling element 1, a diaphragm electrode unit (not shown in FIG. 1) which is arranged underneath the cooling element 1 in terms of the view in FIG. 1. The cooling element 1 includes a coolant space 3 and four corner regions 5a, 5b, 5c, 5d. The mouth of a coolant inflow 7a is arranged in a first corner region 5a, the coolant inflow 7a connecting the coolant space 3 to the axial duct 9a. A first coolant outflow 7b, which connects the coolant space 3 to a first axial duct 9b, opens into a second corner region 5b. In a third corner region 5c of the coolant space 3 there is the mouth of a second coolant outflow 7c which connects the coolant space 3 to a second axial duct 9c. The coolant space 3 has a fourth corner region 5d to which, however, neither a coolant inflow nor a coolant outflow opens.

The fuel cell, and with it the cooling element 1, are planar in the plane of the paper of FIG. 1. The axial ducts 9a, 9b and 9c run perpendicularly to the plane of the fuel cell, that is to say perpendicularly to the plane of the paper. During the operation of the fuel cell, cooling fluid, for example water, flows out of a supply device assigned to the fuel cell and through the axial duct 9a to the cooling element 1 of the fuel cell. It flows through the coolant inflow 7a and passes into the first corner region 5a.

The greater part of the cooling water flows through the coolant space 3, flows through the second corner region 5b and then the first coolant outflow 7b, and passes there to the first axial duct 9b through which it is directed away from the fuel cell. A small part of the cooling water which passes through the coolant inflow 7a into the coolant space 3 flows along the upper edge 11 of the coolant space 3 and passes into the third corner region 5c. From there it flows through the second coolant outflow 7c, passes into the second axial duct 9c and is also directed away from the fuel cell through said axial duct 9c. Air bubbles which collect in the coolant space 3 of the cooling element 1 are driven through the effect of the gravitation to the upper edge 11 of the coolant space 3. This air is driven largely through the second coolant outflow 2 out of the coolant space 3 by the cooling water, and into the axial duct 9c from where it is expelled from the fuel cell.

The arrangement of the second coolant outflow 7c in the corner region 5c ensures that the warm water which collects along the upper edge 11 is conveyed away. As a result, reaction heat which is generated in the fuel cell is given off uniformly to the cooling water within the cooling element 1 in a regional fashion. Regional overheating of the fuel cell is thus effectively avoided.

The fuel cell, and with it the cooling element 1 are configured to be operated arranged in a fuel cell block in such a way that the upper edge 11 of the coolant space 3 is arranged at the top in terms of gravity. As a result of this it is possible to dispense with a further coolant outflow or inflow in the corner region 5d. Cooling water which is heated in the lower half of the coolant space 3 is driven upwards by convection and thus out of the corner region 5d. As a result of this, there is a continuous flow of cool cooling water through the corner region 5d. A third coolant outflow or a second coolant inflow in the corner region 5d is thus not necessarily required.

The coolant outflows 7b and 7c are each configured as a single duct with a rectangular cross section. The flow cross section Q1 of the first coolant outflow 7b has seven times the cross sectional area in comparison with the flow cross section Q2 of the second coolant outflow 7c. Due to the geometry of the coolant outflow 7b and 7c, approximately 7% of the cooling water which enters the coolant space 3 through the coolant inflow 7a flows through the second coolant outflow 7c.

Figure 2:
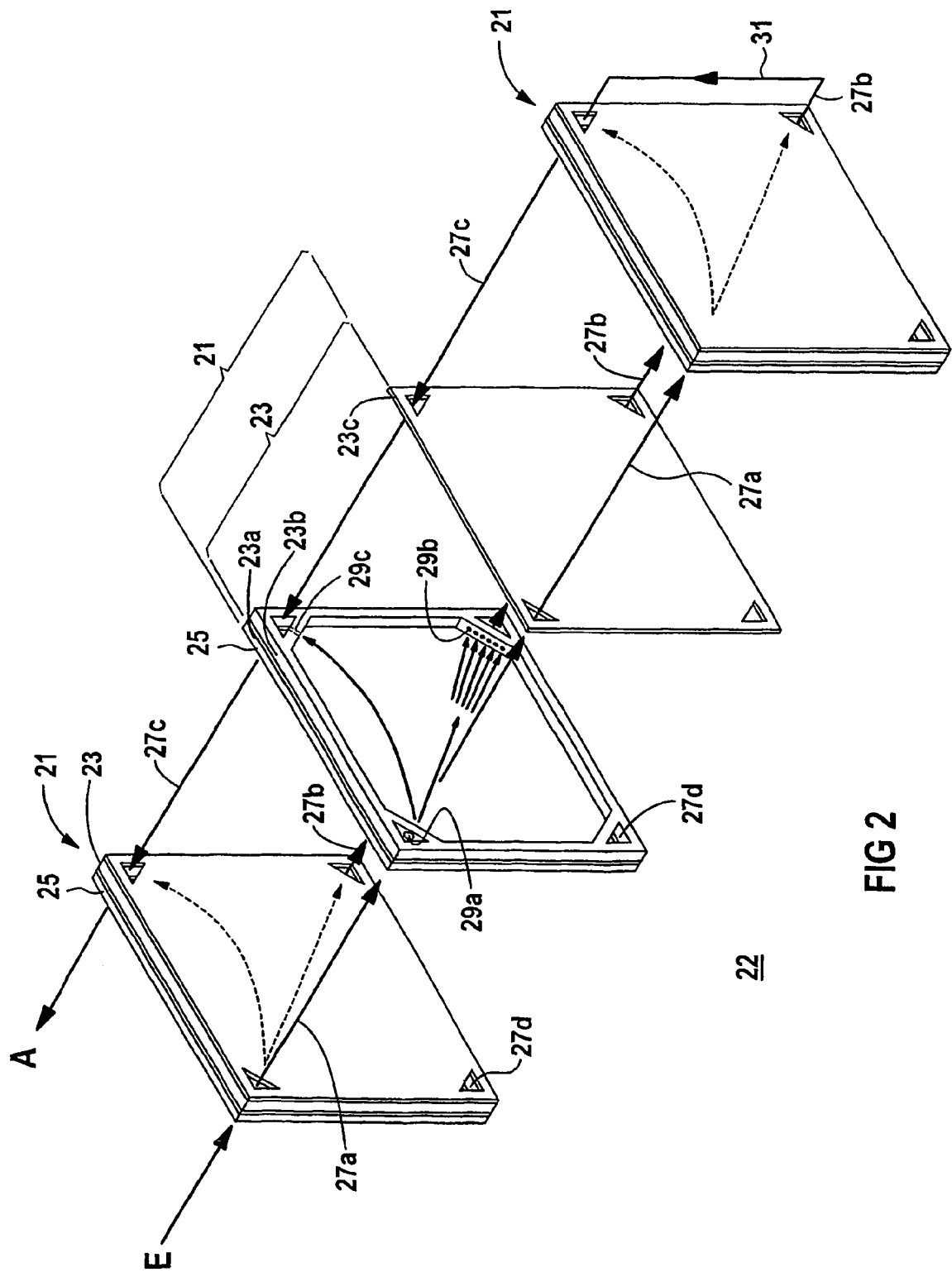
FIG. 2 is an exploded diagram of a fuel cell block in a schematic view.

In FIG. 2, three fuel cells 21 of a fuel cell block 22 are illustrated in the form of an exploded diagram. Each of these fuel cells 21 has a cooling element 23 and a diaphragm electrolyte unit 25. The cooling element 23 includes a frame 23b which is joined on each of its two sides by a plate 23a and 23c, respectively. The frame 23b thus forms, with the two plates 23a, 23c, a cavity, the coolant space.

Each of the fuel cells 21 has in each of the corners a triangular recess. In fuel cells which are positioned one against the other, these recesses form axial ducts 27a, 27b, 27c and 27d which run vertically with respect to the plane of the cell. While the fuel cell block 22 is operating, cooling water flows from a supply device (not shown in more detail in FIG. 2) for the fuel cell block 22 into the inlet E of the axial duct 27a of the fuel cell block 22. The cooling water is directed through the axial duct 27a to the cooling elements 23 of the fuel cell block 22.

In each case some of the cooling water flows through the coolant inflow 29a of each cooling element 23 into the cooling space of the cooling element 23. The greater part of the cooling water flows through the coolant space in a diagonal direction and reaches the first coolant outflow 29b, through which it flows and reaches the first axial duct 27b. This cooling water from the cooling elements 23 of the fuel cells 21 of the fuel cell block 22 collects in the first axial duct 27b and is carried out via the pressure equalization line 31, which is embodied as a line outside the fuel cell block 22, into the second axial duct 27c in which it flows through the fuel cell block 22 and leaves it through the outlet A of the second axial duct 27c. A small part of the cooling water flows from the coolant inflow 29a of each cooling element 23 to the second coolant outflow 29c, through which it is directed to a second axial duct 27c. There, it is combined with the cooling water originating from the first axial duct 27b, and flows to the outlet A of the second axial ducts 27c.

The first coolant outflow 29b of each coolant space is formed from twenty small ducts, only a few of which are shown in FIG. 2. The ducts connect the coolant space to the axial duct 27b. The second coolant outflow 29c of each coolant space is formed by a single duct which connects the coolant space to the second axial duct 27c. The geometry of the ducts is in each case the same so that the flow cross section Q1, composed of twenty duct cross sections, of the first coolant outflow has twenty times the area of the flow cross section Q2, composed of only one duct cross section, of the second coolant outflow 29c. The pressure equalization line 31 ensures that the fluid pressure within the axial ducts 27b and 27c is essentially the same. The pressure ratios within the axial ducts 27b and 27c thus do not favor any of the flows from the coolant inflow 29a to the coolant outflows 29b and 29c. The amounts of coolant which flow off through the coolant outflow 29b and 29c are thus determined decisively by the flow cross sections Q1 and Q2, so that approximately 5% of the cooling water flowing through the coolant space leaves the coolant space through the second coolant outflow 29c.

The invention being thus described, it will be obvious that the same may be varied in many ways. Such variations are not to be regarded as a departure from the spirit and scope of the invention, and all such modifications as would be obvious to one skilled in the art are intended to be included within the scope of the following claims.

The invention claimed is:

1. A planar and essentially rectangular fuel cell, comprising:
   a cooling element, including an essentially rectangular coolant space with four corner regions, the mouth of a coolant inflow being arranged in a first corner region, the mouth of a first coolant outflow being arranged in a second corner region and a second coolant outflow being arranged in a third corner region of the coolant space, wherein the first coolant outflow has a flow cross section Q1 at its narrowest point, the second coolant outflow has a flow cross section Q2 at its narrowest point, and the ratio Q1/Q2 is 7 to 25.

2. The fuel cell as claimed in claim 1, wherein the first corner region and the second corner region are arranged essentially diagonally opposite one another.

3. A fuel cell block comprising at least one fuel cell as claimed in claim 1.

4. A fuel cell block comprising at least one fuel cell as claimed in claim 2.

5. A fuel cell block as claimed in claim 3, wherein the first coolant outflow opens into a first axial duct of the fuel cell block, and the second coolant outflow opens into a second axial duct of the fuel cell block, and the two axial ducts are connected to one another using a pressure equalizing line.

6. A fuel cell block as claimed in claim 4, wherein the first coolant outflow opens into a first axial duct of the fuel cell block, and the second coolant outflow opens into a second axial duct of the fuel cell block, and the two axial ducts are connected to one another using a pressure equalizing line.

7. A fuel cell, comprising:
   a cooling element, including a coolant space with four corner regions, an opening of coolant inflow being arranged in a first corner region, a first opening of coolant outflow being arranged in a second corner region, and a second opening of coolant outflow being arranged in a third corner region of the coolant space, wherein the first opening of coolant outflow including a flow cross section Q1 at its narrowest point, the second coolant outflow including a flow cross section Q2 at its narrowest point, and the ratio Q1/Q2 being approximately 7 to 25.

8. The fuel cell as claimed in claim 7, wherein the first corner region and the second corner region are arranged essentially diagonally opposite one another.

9. A fuel cell block comprising at least one fuel cell as claimed in claim 7.

10. A fuel cell block comprising at least one fuel cell as claimed in claim 8.

11. A fuel cell block as claimed in claim 9, wherein the first opening of coolant outflow opens into a first axial duct of the fuel cell block, and the second opening of coolant outflow opens into a second axial duct of the fuel cell block, and the two axial ducts are connected to one another using a pressure equalizing line.

12. A fuel cell block as claimed in claim 10, wherein the first opening of coolant outflow opens into a first axial duct of the fuel cell block, and the second opening of coolant outflow opens into a second axial duct of the fuel cell block, and the two axial ducts are connected to one another using a pressure equalizing line.

* * * * *